US012562460B2

(12) United States Patent
Liu et al.

(10) Patent No.: US 12,562,460 B2
(45) Date of Patent: Feb. 24, 2026

(54) ELECTRONIC DEVICE

(71) Applicant: VIVO MOBILE COMMUNICATION CO., LTD., Dongguan (CN)

(72) Inventors: Bingzi Liu, Dongguan (CN); Shen Wang, Dongguan (CN); Changming Ma, Dongguan (CN); Lei Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 102 days.

(21) Appl. No.: 18/423,289

(22) Filed: Jan. 25, 2024

(65) Prior Publication Data

US 2024/0162597 A1 May 16, 2024

Related U.S. Application Data

(63) Continuation of application No. PCT/CN2022/109137, filed on Jul. 29, 2022.

(30) Foreign Application Priority Data

Jul. 30, 2021 (CN) ......................... 202110875842.1

(51) Int. Cl.
*H01Q 1/24* (2006.01)
*H01Q 5/321* (2015.01)
*H01Q 13/18* (2006.01)

(52) U.S. Cl.
CPC ............. *H01Q 1/243* (2013.01); *H01Q 5/321* (2015.01); *H01Q 13/18* (2013.01)

(58) Field of Classification Search
CPC ......... H01Q 1/243; H01Q 5/321; H01Q 13/18
See application file for complete search history.

(56) References Cited

U.S. PATENT DOCUMENTS

2002/0149522 A1* 10/2002 Hwang .................... G06F 1/186
343/702
2014/0112511 A1 4/2014 Corbin et al.
2021/0098869 A1* 4/2021 Ruaro .................... H04M 1/026

FOREIGN PATENT DOCUMENTS

CN 101958456 A 1/2011
CN 103022688 A 4/2013
CN 205141120 U 4/2016
CN 105977614 9/2016
CN 106654584 A 5/2017
KR 101681902 B1 12/2016

OTHER PUBLICATIONS

International Search Report issued in corresponding International Application No. PCT/CN2022/109137, mailed Oct. 17, 2022, 4 pages.
Second Office Action issued in related Chinese Application No. 202110875842.1, mailed Dec. 18, 2025, 14 pages.

* cited by examiner

*Primary Examiner* — Daniel Munoz
(74) *Attorney, Agent, or Firm* — IPX PLLC

(57) ABSTRACT

This application discloses an electronic device. The electronic device includes an antenna unit, a housing, and a radio frequency transceiver. The antenna unit is spaced apart from the housing, a cavity and a signal transmitting opening are formed between the antenna unit and the housing, the antenna unit is provided with a feed contact point, and the antenna unit is connected to the radio frequency transceiver through the feed contact point, where the signal transmitting opening is used to transmit a signal of the antenna unit.

10 Claims, 6 Drawing Sheets

ELECTRONIC DEVICE

CROSS-REFERENCE TO RELATED APPLICATIONS

The application is a continuation of International Application No. PCT/CN2022/109137, filed on Jul. 29, 2022, which claims priority to Chinese Patent Application No. 202110875842.1, filed Jul. 30, 2021. The entire contents of each of the above-identified applications are expressly incorporated herein by reference.

TECHNICAL FIELD

This application pertains to the technical field of electronic devices, and in particular, to an electronic device.

BACKGROUND

With the development of communication technology, users demand more and more electronic devices, such as mobile phones, tablets, smart watches, and the like. Whether operating independently or cooperatively, these electronic devices need to be equipped with antennas that can cover single or a plurality of frequency bands and realize single or a plurality of functions. A range of frequency bands that may need to be covered includes: low frequency, low-medium frequency, medium-high frequency, high frequency, and other frequency bands. This makes it difficult to design the antenna of the electronic device.

In addition, the electronic device is sensitive to thickness of the whole machine, which means that a physical volume and an electric aperture of the antenna are reduced. Because radiation efficiency of the antenna is directly proportional to a size of the electric aperture thereof, a lighter, thinner, and smaller product directly leads to a worse antenna environment. With an increasing proportion of a screen, the screen plays a more significant role in absorbing and shielding the antenna. Coupled with an integrated metal back cover, an internal radiation environment of the antenna is worse, which makes the radiation efficiency of the antenna low and performance unstable. Therefore, how to design the antenna structure is an urgent problem that needs to be resolved currently.

SUMMARY

Embodiments of this application provide an electronic device.

According to a first aspect, an electronic device is provided, where the electronic device includes an antenna unit, a housing, and a radio frequency transceiver; and

- the antenna unit is spaced apart from the housing, a cavity and a signal transmitting opening are formed between the antenna unit and the housing, the antenna unit is provided with a feed contact point, and the antenna unit is connected to the radio frequency transceiver through the feed contact point, where
- the signal transmitting opening is used to transmit a signal of the antenna unit.

Embodiments of this application disclose an electronic device, where the electronic device includes an antenna unit, a housing, and a radio frequency transceiver. The antenna unit is spaced apart from the housing, a cavity and a signal transmitting opening are formed between the antenna unit and the housing, the antenna unit is provided with a feed contact point, and the antenna unit is connected to the radio frequency transceiver through the feed contact point, where the signal transmitting opening is used to transmit a signal of the antenna unit. In the embodiments of this application, the antenna unit and the housing form a cavity, and a signal transmitting opening is formed. A signal can be transmitted through the signal transmitting opening when a metal back cover of the electronic device is integrated.

BRIEF DESCRIPTION OF DRAWINGS

The accompanying drawings described herein are intended to provide a further understanding of this application and form a part of this application. The embodiments of this application and the descriptions thereof are used to explain this application.

DETAILED DESCRIPTION

The following describes embodiments of this application with reference to accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first," "second," and the like in this specification and claims of this application are used to distinguish between similar objects instead of describing a specific order or sequence. It should be understood that the data used in such a way is interchangeable in proper circumstances so that the embodiments of this application can be implemented in an order other than the order illustrated or described herein. In addition, in this specification and the claims, "and/or" represents at least one of connected objects, and a character "/" generally represents an "or" relationship between associated objects.

With reference to the accompanying drawings, an electronic device 100 in an embodiment of this application is described in detail below based on specific embodiments and application scenarios thereof.

Figure 1:
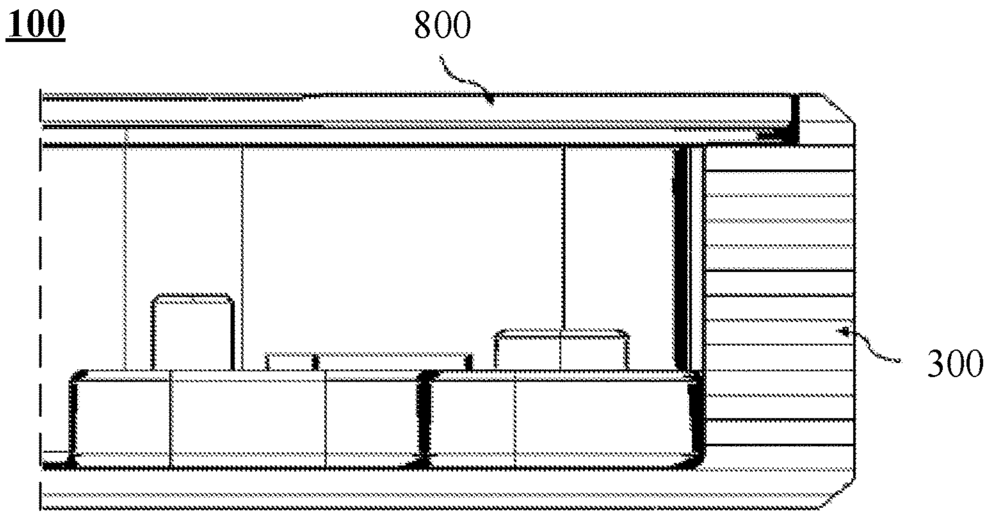
FIG. 1 is a schematic diagram of a structure of an electronic device according to an embodiment of this application.
Figure 2:
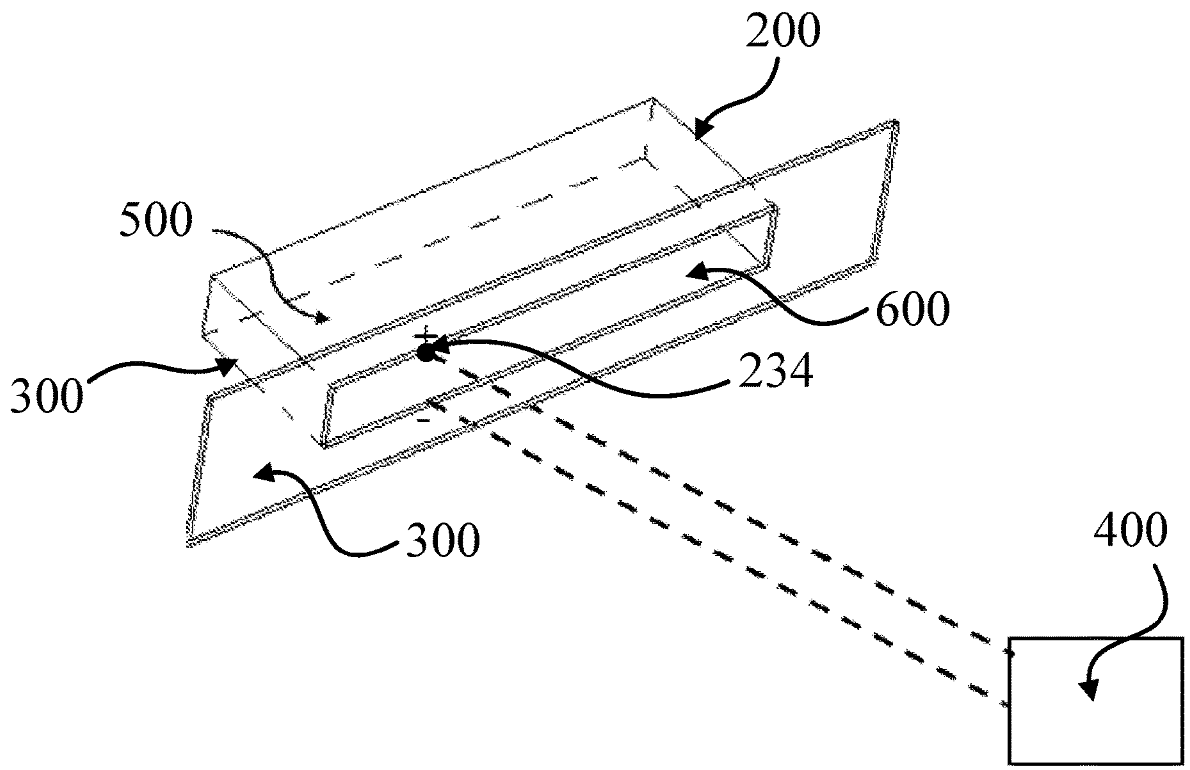
FIG. 2 is a schematic diagram of a structure of an electronic device according to an embodiment of this application.
Figure 3:
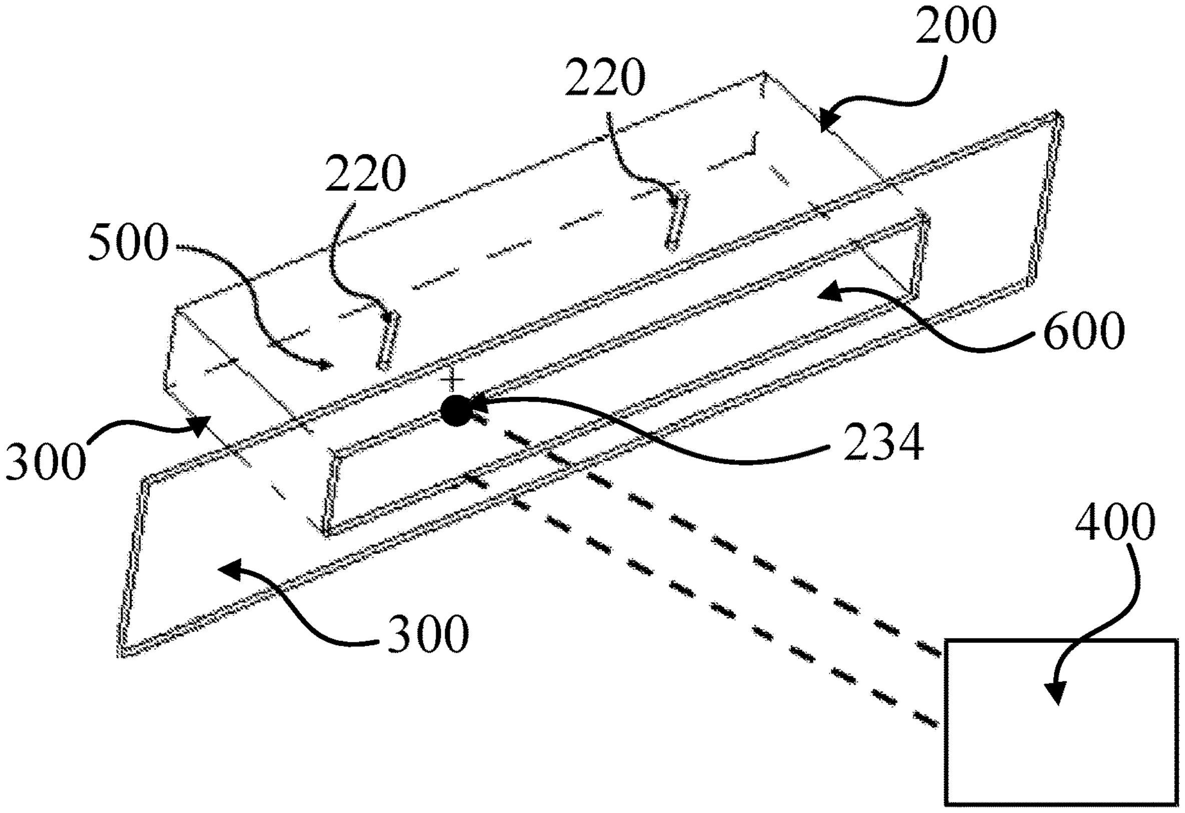
FIG. 3 is a schematic diagram of a structure of an electronic device according to an embodiment of this application.
Figure 4:
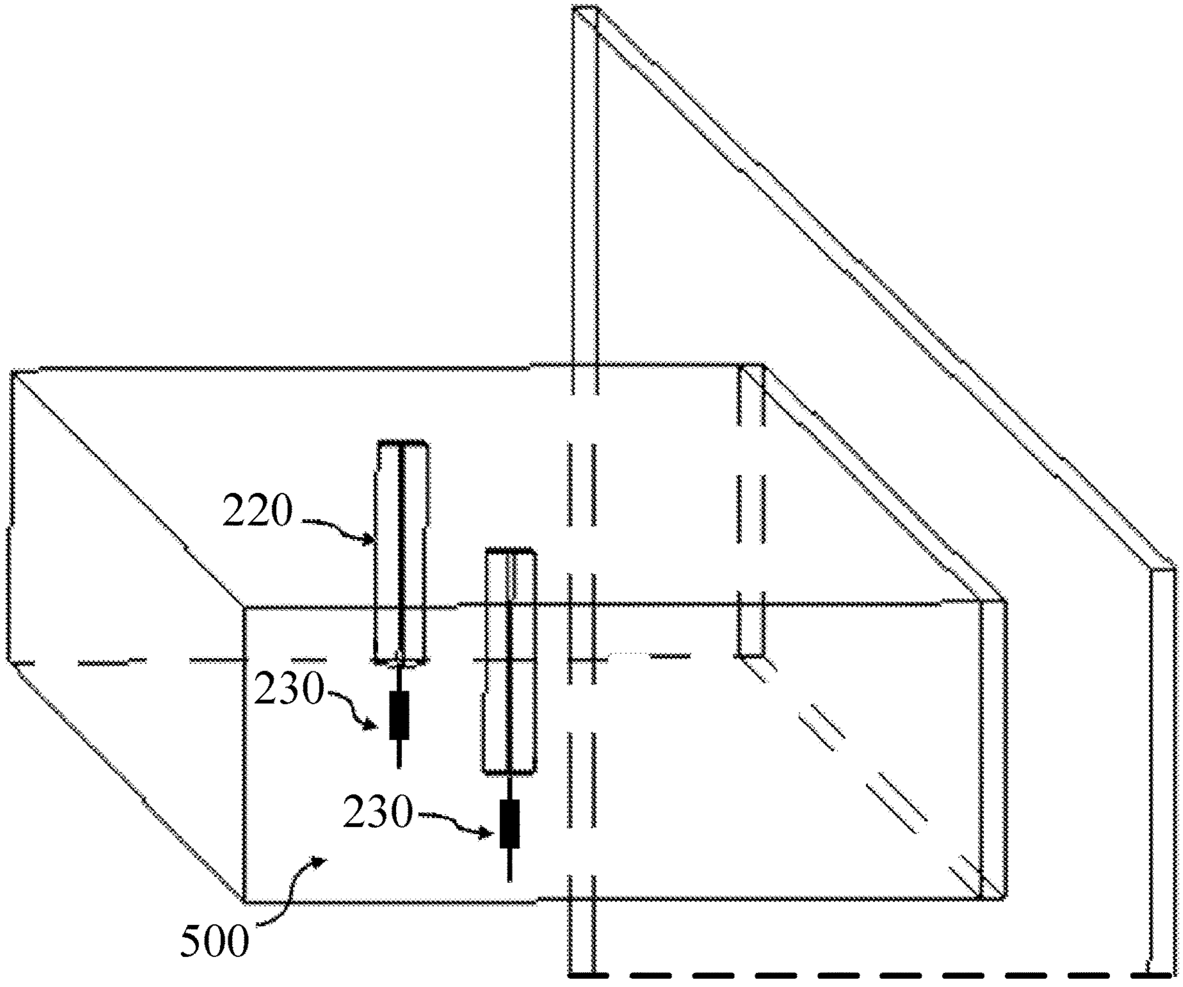
FIG. 4 is a schematic diagram of a structure of an electronic device according to an embodiment of this application.
Figure 5:
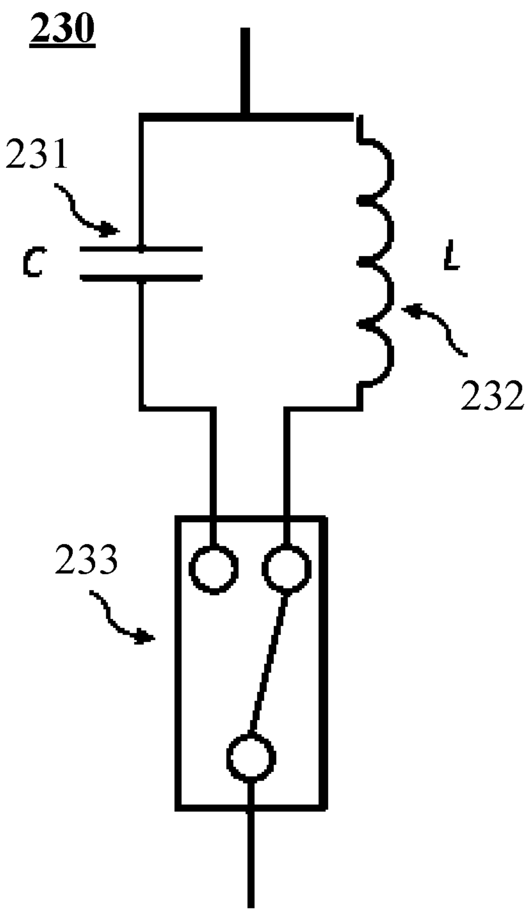
FIG. 5 is a schematic diagram of a circuit of a connecting device according to an embodiment of this application.
Figure 6:
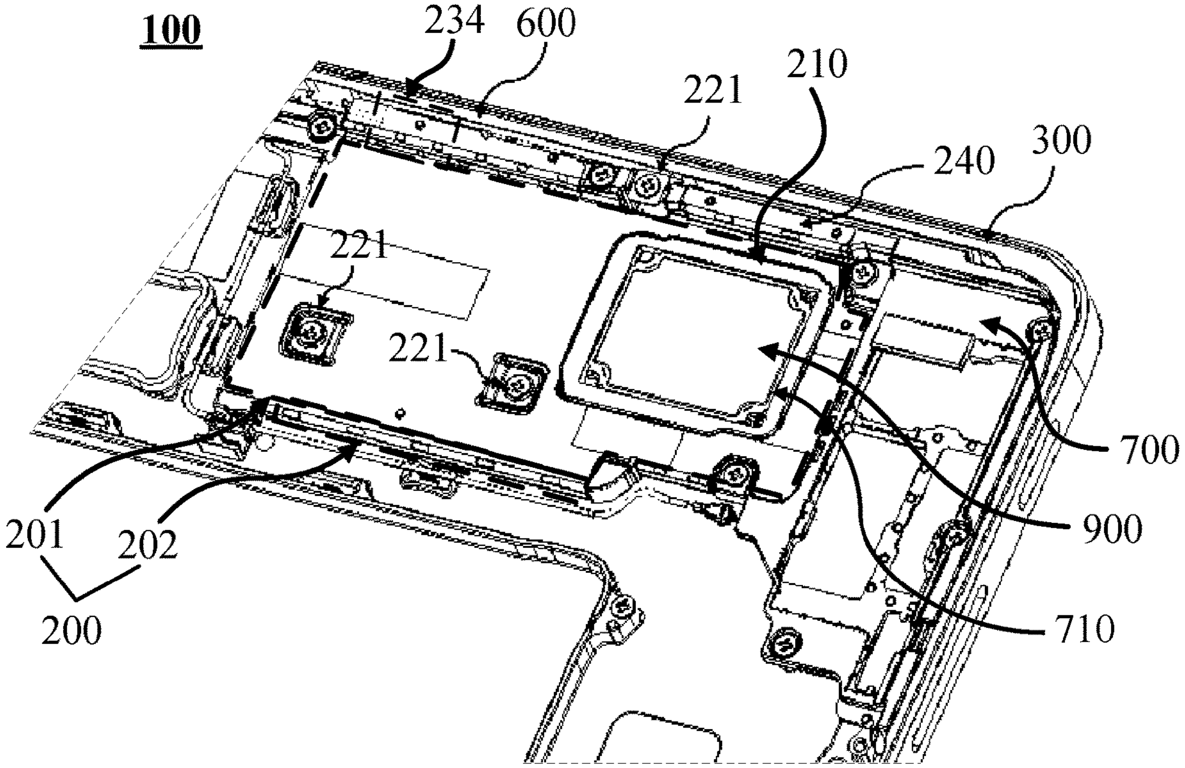
FIG. 6 is a schematic diagram of a structure of an electronic device according to an embodiment of this application.
Figure 7:
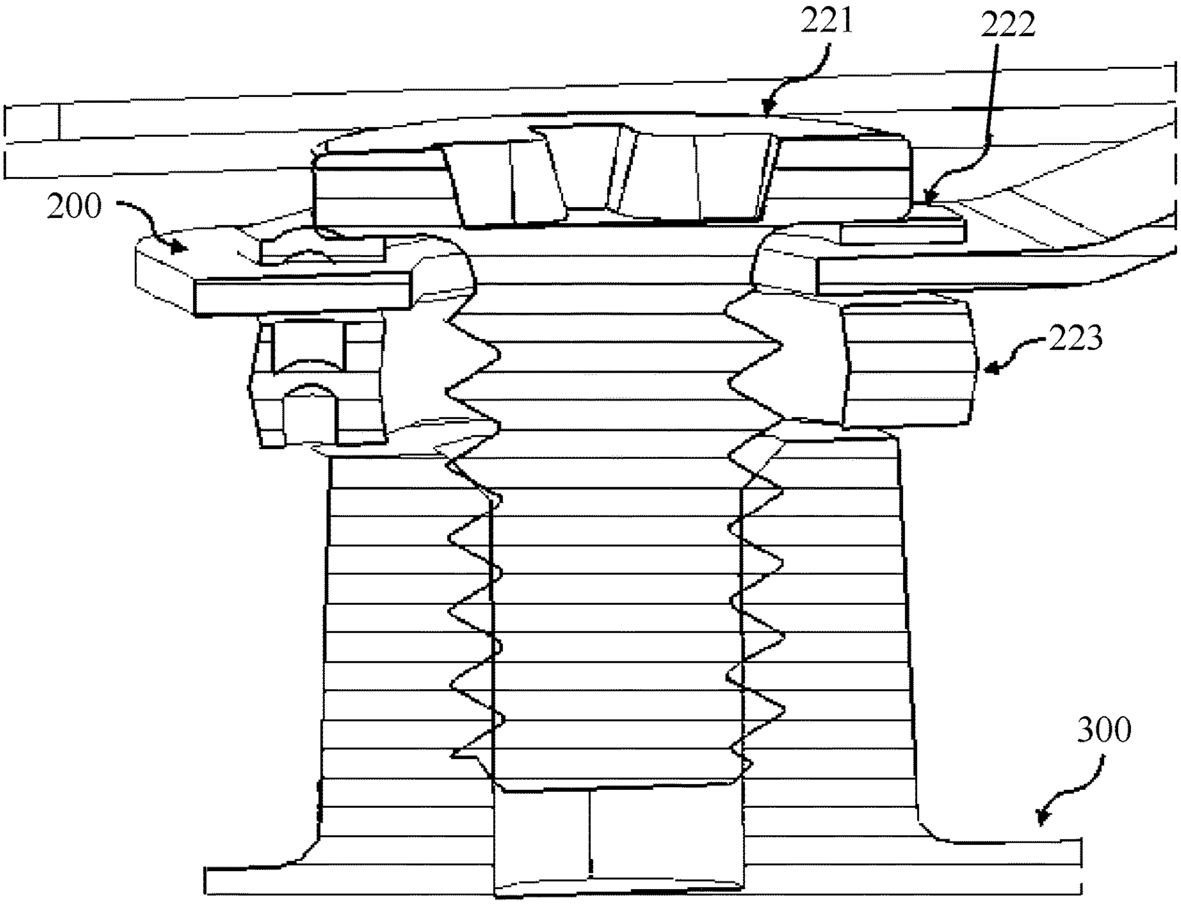
FIG. 7 is a schematic diagram of a connecting structure of a screw according to an embodiment of this application.

As shown in FIG. 2 to FIG. 7, FIG. 2 to FIG. 7 are schematic diagrams of structures of an electronic device 100 according to an embodiment of this application. The electronic device 100 may include an antenna unit 200, a housing 300, and a radio frequency transceiver 400.

In some implementations, the antenna unit 200 is spaced apart from the housing 300, a cavity 500 and a signal transmitting opening 600 are formed between the antenna unit 200 and the housing 300, the antenna unit 200 is provided with a feed contact point 234, and the antenna unit 200 is connected to the radio frequency transceiver 400 through the feed contact point 234. The signal transmitting opening 600 is used to transmit a signal of the antenna unit 200.

It is worth noting that the inside of the cavity 500 formed between the antenna unit 200 and the housing 300 can be filled with air or a medium, and a material of the medium can be plastic, ceramic or glass, or a mixture of various materials. The plastic can be polyamide, polycarbonate or terpolymer of acrylonitrile, butadiene, and styrene. In practical application, functional devices 900 such as speakers, motors, or cameras can be arranged in the cavity 500, that is, the cavity formed between the antenna and the housing can be an original cavity of functional devices 900 such as multiplexed speakers or motors or cameras. The signal transmitting opening 600 may be a structure surrounded by the antenna unit 200 and the housing 300, or an opening provided on the antenna unit 200. The signal transmitting opening 600 may be rectangular, L-shaped, or in other irregular shapes, which depends on the actual situation.

The housing 300 can be in a seamless integrated metal structure 223 made of aluminum alloy, magnesium alloy, stainless steel, or the like.

The electronic device 100 in this embodiment of this application can include a screen display assembly 800, a motherboard, a battery, and other structures in addition to the foregoing structures, where the screen display assembly 800 may include a plurality of layers of structures, such as a touch screen, an optical adhesive, a display layer, a back light, a metal frame, and the like. The motherboard can be made of a plurality of layers of metal and medium, and may be in rectangular, L-shaped, or other irregular shapes. The battery may include a single battery cell or a plurality of battery cells with the material of nickel hydrogen or lithium ion, and may be in rectangular, L-shaped, or other shapes. Considering the brevity of the text, this is not described one by one in this application.

In this embodiment of this application, electronic device 100 includes an antenna unit 200, a housing 300, and a radio frequency transceiver 400. The antenna unit 200 is spaced apart from the housing 300, a cavity 500 and a signal transmitting opening 600 are formed between the antenna unit 200 and the housing 300, the antenna unit 200 is provided with a feed contact point 234, the antenna unit 200 is connected to the radio frequency transceiver 400 through the feed contact point 234, and the signal transmitting opening 600 is used to transmit a signal of the antenna unit 200. In this embodiment of this application, the antenna unit 200 and the housing 300 form a cavity 500, and a signal transmitting opening 600 is formed. A signal can be transmitted through the signal transmitting opening 600 when a metal back cover of the electronic device 100 is integrated. By setting the signal transmitting opening 600, the radiation efficiency of the antenna unit 200 is not affected by the integrated metal back cover of the electronic device 100, and performance of the antenna unit 200 is more stable.

In an implementation of this application, the electronic device 100 may further include a metal connecting piece 220, the metal connecting piece 220 passes through the cavity 500, a first end of the metal connecting piece 220 is connected to the antenna unit 200, and a second end of the metal connecting piece 220 is connected to the housing 300.

In some implementations, the metal connecting piece 220 can be added into the cavity 500 formed between the antenna and the housing 300. One end of the metal connecting piece 220 is connected to the antenna unit 200, and the other end of the metal connecting piece 220 is connected to the housing 300. An operating frequency of the antenna unit 200 can be adjusted through the metal connecting piece 220, thus achieving a multi-band and high-bandwidth coverage effect.

The number of the metal connecting piece 220 can be one, two or more, and positions thereof can be closer or farther relative to the signal transmitting opening 600. The closer the metal connecting piece 220 is to the signal transmitting opening 600, the higher the operating frequency of the antenna unit 200 is. In some implementations, an operating frequency band of the antenna unit 200 can be adjusted by setting the position of the metal connecting piece 220, so that the antenna unit 200 operates in a high frequency band, a low frequency band, or the like.

The metal connecting piece 220 can be formed by various structures such as a spring clip, a pogo-pin, a screw 221, or a screw 221 with a gasket.

In an implementation of this application, the electronic device 100 may further include a connecting device 230, a first end of the connecting device 230 is connected to the second end of the metal connecting piece 220, and a second end of the connecting device 230 is connected to the housing 300.

In some implementations, the metal connecting piece 220 can be connected to the housing 300 through the connecting device 230, or the metal connecting piece 220 is connected to the antenna unit 200 through the connecting device 230, which depends on the actual situation.

The connecting device 230 may include a capacitor 231 and/or an inductor 232. In some implementations, the metal connecting piece 220 can also be connected to the housing 300 or the antenna unit 200 through the capacitor 231 or the inductor 232, and then an operating frequency range of the antenna unit 200 can be adjusted, so that the antenna unit 200 can operate in different frequency ranges, and an operating frequency band is wider, thus meeting multi-band requirements of users. It is also possible to further increase the operating frequency band of the antenna by adjusting a capacitance or inductance of the capacitor 231 or the inductor 232.

The capacitance of the capacitor 231 can be 0.3 pF, 0.5 pF, 1.0 pF, 3 pF, 12 pF, or the like, and the inductance of the inductor 232 can be 0.5 nH, 1.0 nH, 5 nH, 15 nH, 30 nH, or the like. The capacitance of the capacitor 231 can also be 0, and the inductance of the inductor 232 can also be 0. In some implementations, the metal connecting piece 220 is directly connected to the antenna unit 200 and the housing 300.

In an implementation of this application, the connecting device 230 may include a capacitor 231, an inductor 232, and a single-pole double-throw switch 233, both a first end of the capacitor 231 and a first end of the inductor 232 are connected to the second end of the metal connecting piece 220, a second end of the capacitor 231 is connected to a first moving contact of the single-pole double-throw switch 233, a second end of the inductor 232 is connected to a second moving contact of the single-pole double-throw switch 233, and a fixed contact of the single-pole double-throw switch 233 is connected to the housing 300.

It should be noted that the single-pole double-throw switch 233 can also be replaced with a single-pole single-throw switch, a single-pole three-throw switch, a single-pole four-throw switch, a double-pole single-throw switch, and the like. Correspondingly, for example, a single-pole single-throw switch is used, one end of the single-pole single-throw switch is connected to the capacitor 231 or the inductor 232, and the other end of the single-pole single-throw switch is connected to the housing 300. In another example, a double-pole single-throw switch is used, a moving contact of the double-pole single-throw switch is separately connected to the capacitor 231 and the inductor 232, and a fixed contact of the double-pole single-throw switch is connected to the housing 300. A parallel structure of the capacitor 231 and the inductor 232 can be connected to the circuit structure by connecting the switch, or the antenna unit 200 can be disconnected from the housing 300 by disconnecting the switch. A specific connection structure shall be subject to an actual demand.

In this embodiment, the operating frequency of the antenna unit 200 can be controlled by controlling an on-state of the single-pole double-throw switch 233, a capacitance value, an inductance value, and the like, so that the antenna unit 200 can achieve a multi-band and high-bandwidth coverage effect and meet various needs of users.

In an implementation of this application, there may be a plurality of metal connecting pieces 220.

By arranging a plurality of metal connecting pieces 220 and controlling an operating state of each metal connecting piece 220, such as connecting to or disconnecting from the antenna unit 200 and the housing 300, the antenna unit 200 can be adjusted to operate in different frequency bands.

In an implementation of this application, the antenna unit 200 is provided with a first mounting hole 210, and the first mounting hole 210 is provided with a functional device 900.

The functional device 900 may include at least one of a speaker, a motor, a camera, and the like.

It is worth noting that in this embodiment of this application, the first mounting hole 210 is opened in the antenna unit 200 to mount the functional device 900, so that an overall structure is more compact, and space occupied by the antenna unit 200 can be reduced. The performance of the antenna unit 200 will not be affected greatly when the space occupied by the antenna is reduced.

In an implementation of this application, the electronic device 100 further includes a bracket 700, the bracket 700 is arranged on one side of the antenna unit 200 facing the housing 300, and the metal connecting piece 220 is further used to fix the bracket 700 to the housing 300. The number of metal connecting pieces 220 for fixing the bracket 700 to the housing 300 may be one or two or more, which depends on the actual application.

In some implementations, the antenna unit 200 can be separated from the housing 300 through the housing 300, and the antenna unit 200 can be attached to a surface of the bracket 700 facing away from the housing 300 in the form of Flexible Printed Circuit (FPC), or formed on the surface of the bracket 700 facing away from the housing 300 in the form of Laser Direct Structuring (LDS), can also be embedded in the structure of the bracket 700 in the form of copper sheet or steel sheet, or can be a combination of the above forms, which depends on the actual situation.

There may be one or more brackets 700, and the bracket 700 may be a bracket 700 of a speaker or a bracket 700 of a motor, a camera, and the like. The bracket 700 can not only support the functional device 900, but also support the antenna unit 200, so that the antenna unit 200 does not need other structures to be supported, so as to be spaced apart from the housing 300, reduce some other structures, reduce internal structures of the electronic device 100, and increase space of other devices.

It is worth noting that the metal connecting piece 220 can be a screw 221 or in other structures. The metal connecting piece 220 not only plays the role of contacting the antenna unit 200 with the housing 300 and adjusting the operating frequency band of the antenna unit 200, but also plays the role of fixing the bracket 700 to the housing 300.

For example, the metal connecting piece 220 is the screw 221, and the side of the antenna unit 200 facing away from the bracket 700 is provided with a gasket structure, which can be a metal gasket 222 or a medium. The metal gasket 222 is used as an example, a side of the metal gasket 222 facing the antenna unit 200 is in contact with the antenna unit 200 in the form of welding, and a side of the metal gasket 222 facing away from the antenna unit 200 is connected to the screw 221. The side of the antenna unit 200 facing bracket 700 is provided with a metal structure 223, which can be an annular metal structure 223 or other structures. A side of the metal structure 223 facing the antenna unit 200 is in contact with the antenna unit 200, and a side of the metal structure 223 facing away from the antenna unit 200 is connected to a screw post on the housing 300. A screw rod of the screw 221 is arranged in the screw post to realize connection between the antenna unit 200 and the housing 300, and to support the bracket 700.

Correspondingly, bracket 700 is provided with a second mounting hole 710, the second mounting hole 710 is opposite to the first mounting hole 210, and the second mounting hole 710 is provided with the functional device 900.

In some implementations, the bracket 700 is provided with the second mounting hole 710 at a position corresponding to the first mounting hole 210 on the antenna unit 200, so that the functional device 900 can be mounted on the bracket 700, and the bracket 700 plays a role in supporting the functional device 900.

In an implementation of this application, there may be a plurality of antenna units 200, and the plurality of antenna units 200 are arranged at intervals.

In other words, one electronic device 100 can be provided with a plurality of antenna units 200, so as to realize a multi-frequency operating range, so that the electronic device 100 can operate in a plurality of frequency bands and realize a communication function of Multiple Input Multiple Output (MIMO).

The antenna units 200 are arranged at intervals, so that the antenna units 200 do not affect each other.

The antenna unit 200 can be connected to the housing 300 by arranging conductive foam, conductive sponge, or gold-plated conductive cloth foam on a side facing the housing 300 of an edge other than an edge of the signal transmitting opening 600, or connected to the housing 300 by extending a side edge of the antenna unit 200 downwards, or connected by using other structures.

In an implementation of this application, the antenna unit 200 may include a body portion 201 and an extension portion 202, the extension portion 202 is arranged on one side of the body portion 201 facing the housing 300, and the body portion 201 is connected to the housing 300 through the extension portion 202.

In some implementations, the antenna unit 200 is connected to the housing 300 by extending the body portion 201 towards the extension portion 202 of the housing 300. Being connected by extending, the connection can be closer, and the cavity 500 between the antenna and the housing can be larger under the condition of reducing bonding structures or adhesive.

The extension portion 202 can be connected to the housing 300 through an electric-conductor.

The electric-conductor may include at least one of conductive foam, conductive sponge, gold-plated conductive cloth foam, and conductive adhesive.

In some implementations, one side of the electric-conductor contacts the side of the extension portion 202 facing the housing 300, and the other side of the electric-conductor contacts the side of the housing 300 facing the extension portion 202, so that the antenna unit 200 is connected to the housing 300, and the cavity 500 and the signal transmitting opening 600 are formed. In this way, a signal of the antenna unit 200 can be better transmitted.

In an implementation of this application, a feeding mode of the antenna unit 200 can be in the form of cable, Printed Circuit Board (PCB) wiring, or metal structure 223, such as a spring clip, a pogo-pin, a screw 221 with a gasket, and the like.

The form of cable feeding is used as an example. The feed contact point 234 is set at any position on antenna unit 200 corresponding to the position where the signal transmitting opening 600 is located, which can be in the middle position or on a specific edge, and the feed contact point 234 is set at one end of the antenna unit 200 near the signal transmitting opening 600. A feed cable is connected to antenna unit 200 through the feed contact point 234, which can be connected by welding, adhesive bonding, or the like, and is not listed one by one in this application. An outer layer of the feed cable is provided with a metal shielding layer, where the metal shielding layer can be connected to the housing through a structure such as the bracket 700 or the screw 221, and then connected to the ground.

Further, antenna unit 200 can be in the form of direct feed, that is, a feed area is directly connected to other parts of antenna unit 200, to form a whole. The antenna unit 200 can also be in the form of coupling feed, that is, the feed area is spaced apart from other parts of antenna unit 200, the two parts are independent of each other, and energy is coupled through a gap between the two parts. A size of the gap plays an important role in energy feed and a corresponding effect of antenna unit 200.

In this embodiment of this application, antenna unit 200 can be located at any position of electronic device 100. In some implementations, antenna unit 200 is located at a frame of electronic device 100, which is better for a radio frequency signal to be radiated.

The operating frequency range of antenna unit 200 may be: low frequency of 700-960 MHz, low-medium frequency of 1400-1600 MHz, medium-high frequency of 1700-2700 MHz, and 3300-3800 MHz and 4400-5000 MHz in 5G NR. In addition, it may be necessary to cover GNSS, WiFi/BT and other related frequency bands. The antenna unit 200 can operate in a single frequency band or in a plurality of frequency bands, which depends on the actual application.

It should be noted that, in this specification, the term "include," "comprise," or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially or the part contributing to the related art may be implemented in a form of a software product. The computer software product is stored in a storage medium (such as a ROM/RAM, a hard disk, or an optical disc), and includes several instructions for instructing a terminal (which may be a mobile phone, a computer, a server, an air-conditioner, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An electronic device, comprising:
- an antenna unit;
- a housing;
- a radio frequency transceiver, wherein:
  - the antenna unit is spaced apart from the housing;
  - a cavity and a signal transmitting opening are formed between the antenna unit and the housing;
  - the antenna unit is provided with a feed contact point; and
  - the antenna unit is connected to the radio frequency transceiver through the feed contact point, wherein the signal transmitting opening is used to transmit a signal of the antenna unit; and
- a metal connecting piece passing through the cavity, wherein a first end of the metal connecting piece is connected to the antenna unit, and a second end of the metal connecting piece is connected to the housing.

2. The electronic device according to claim 1, further comprising:
- a connecting device, wherein a first end of the connecting device is connected to the second end of the metal connecting piece, and a second end of the connecting device is connected to the housing.

3. The electronic device according to claim 2, wherein the connecting device comprises a capacitor or an inductor.

4. The electronic device according to claim 2, wherein the connecting device comprises a capacitor, an inductor, and a single-pole double-throw switch,
- both a first end of the capacitor and a first end of the inductor are connected to the second end of the metal connecting piece,
- a second end of the capacitor is connected to a first moving contact of the single-pole double-throw switch,
- a second end of the inductor is connected to a second moving contact of the single-pole double-throw switch, and
- a fixed contact of the single-pole double-throw switch is connected to the housing.

5. The electronic device according to claim 1, wherein the antenna unit is provided with a first mounting hole, and the first mounting hole is provided with a functional device, wherein the functional device comprises at least one of a speaker, a motor, or a camera.

6. The electronic device according to claim 5, further comprising:

a bracket, wherein the bracket is arranged on one side of the antenna unit facing the housing, and the metal connecting piece is further used to fix the bracket to the housing.

7. The electronic device according to claim 6, wherein the bracket is provided with a second mounting hole, the second mounting hole is opposite to the first mounting hole, and the second mounting hole is provided with the functional device.

8. The electronic device according to claim 1, further comprises:

a plurality of antenna units arranged at intervals connecting to the housing.

9. The electronic device according to claim 1, wherein the antenna unit comprises a body portion and an extension portion, the extension portion is arranged on one side of the body portion facing the housing, and the body portion is connected to the housing through the extension portion.

10. The electronic device according to claim 9, wherein the extension portion is connected to the housing through an electric-conductor.

* * * * *